US012647229B2

(12) United States Patent
Yang

(10) Patent No.: US 12,647,229 B2
(45) Date of Patent: Jun. 2, 2026

(54) METHOD AND APPARATUS FOR DETERMINING TRANSMISSION RESOURCE, AND COMMUNICATION DEVICE AND STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 437 days.

(21) Appl. No.: 18/257,053

(22) PCT Filed: Dec. 16, 2020

(86) PCT No.: PCT/CN2020/137000
§ 371 (c)(1),
(2) Date: Jun. 12, 2023

(87) PCT Pub. No.: WO2022/126459
PCT Pub. Date: Jun. 23, 2022

(65) Prior Publication Data
US 2024/0097845 A1     Mar. 21, 2024

(51) Int. Cl.
H04L 5/00          (2006.01)
H04W 72/40         (2023.01)
(Continued)

(52) U.S. Cl.
CPC .......... H04L 5/0048 (2013.01); H04L 5/0053 (2013.01); H04W 72/40 (2023.01); H04W 76/14 (2018.02); H04W 92/18 (2013.01)

(58) Field of Classification Search
CPC ........ G01S 5/0018; G01S 5/0072; G01S 5/10; G01S 1/306; G01S 1/308; G01S 5/12; H04L 5/0048; H04L 5/0053; H04L 5/0094; H04L 5/0091; H04W 4/02; H04W 4/023; H04W 4/029; H04W 64/00;
(Continued)

(56) References Cited

U.S. PATENT DOCUMENTS 10,917,825 B2    2/2021  Peisa et al.
2008/0130590 A1   6/2008  Kim et al.
(Continued)

FOREIGN PATENT DOCUMENTS

CN          101198185 A     6/2008
CN          101325802 A    12/2008
(Continued)

OTHER PUBLICATIONS

International Search Report Issued Aug. 26, 2021, in PCT/CN2020/137000, filed on Dec. 16, 2020, 2 pages.
(Continued)

*Primary Examiner* — Thomas R Cairns
(74) *Attorney, Agent, or Firm* — Oblon, McClelland, Maier & Neustadt, L.L.P.

(57)          ABSTRACT

A method for determining a transmission resource of a relative positioning signal includes: sending, by a base station, resource configuration information, wherein the resource configuration information is used for a terminal to determine a transmission resource used for transmitting a relative positioning signal.

18 Claims, 8 Drawing Sheets

(51) Int. Cl.
    *H04W 76/14*     (2018.01)
    *H04W 92/18*     (2009.01)

(58) Field of Classification Search
    CPC . H04W 64/003; H04W 64/006; H04W 72/02;
               H04W 72/04; H04W 72/12; H04W 72/40;
               H04W 76/10; H04W 76/14; H04W 92/18;
               H04W 8/005; H04W 76/23; H04W 84/18;
                                      H04W 88/04
    See application file for complete search history.

(56)                   References Cited

U.S. PATENT DOCUMENTS

| | | |
|---|---|---|
| 2015/0296450 A1 | 10/2015 | Koo et al. |
| 2016/0262144 A1 | 9/2016 | Kitazoe et al. |
| 2017/0134999 A1 | 5/2017 | Wu et al. |
| 2017/0230915 A1 | 8/2017 | Kim et al. |
| 2019/0090250 A1 | 3/2019 | Lee et al. |
| 2020/0022125 A1 | 1/2020 | Li et al. |
| 2020/0275244 A1* | 8/2020 | Lee ........................ G01S 5/0284 |
| 2020/0280940 A1 | 9/2020 | Kim et al. |
| 2020/0296614 A1* | 9/2020 | Lee ..................... H04W 64/006 |
| 2021/0014011 A1 | 1/2021 | Xiong et al. |
| 2021/0297987 A1 | 9/2021 | Hwang et al. |
| 2022/0046542 A1 | 2/2022 | Hwang et al. |
| 2022/0167398 A1 | 5/2022 | Myung et al. |
| 2022/0357418 A1* | 11/2022 | Wang ................... H04L 5/0069 |
| 2023/0251342 A1* | 8/2023 | Zhu ........................ H04W 60/00 |
| | | 455/456.1 |
| 2023/0300778 A1* | 9/2023 | Yang ................. H04W 36/0058 |
| | | 370/329 |
| 2023/0354275 A1 | 11/2023 | Moon et al. |

FOREIGN PATENT DOCUMENTS

| | | |
|---|---|---|
| CN | 101772160 A | 7/2010 |
| CN | 108811049 A | 11/2018 |
| CN | 109076484 A | 12/2018 |
| CN | 109548079 A | 3/2019 |
| CN | 110427738 A | 11/2019 |
| CN | 110650538 A | 1/2020 |
| CN | 110771237 A | 2/2020 |
| CN | 111030799 A | 4/2020 |
| CN | 111343567 A | 6/2020 |
| CN | 111464965 A | 7/2020 |
| CN | 111867034 A | 10/2020 |
| CN | 111989585 A | 11/2020 |
| WO | WO-2020/087289 A1 | 5/2020 |

OTHER PUBLICATIONS

Chinese Office Action Issued Aug. 8, 2022, in Chinese Application 202080003988.0 (7 pages).

Intel Corporation, "On Remaining Details of Resource Pool Configuration for D2D Communication", 3GPP TSG RAN WG1 Meeting #78bis, R1-143763, Oct. 2014, 7 pages.

Guangdong OPPO Mobile Telecom, "Time-domain resource allocation for NR", 3GPP TSG RAN WG1 NR Ad-Hoc#2, R1-1710165, Jun. 2017, 8 pages.

International Search Report issued May 11, 2021 in PCT/CN2020/108462 (with English translation), 4 pages.

Combined Chinse Office Action and Search Report issued Sep. 5, 2022 in Chinese Patent Application No. 202080001889.9 (with English translation), 20 pages.

Combined Chinse Office Action and Search Report issued May 17, 2023 in Chinese Patent Application No. 202080001889.9 (with English translation), 20 pages.

Chinese Notice of Allowance issued Sep. 19, 2023 in Chinese Patent Application No. 202080001889.9 (with English translation), 9 pages.

Office Action mailed May 5, 2025 in co-pending U.S. Appl. No. 18/017,988, 13 pages.

* cited by examiner

Terminal

Base Station

Step 21, send resource configuration information, where the resource configuration information is used for a terminal to determine a transmission resource used for transmitting a relative positioning signal

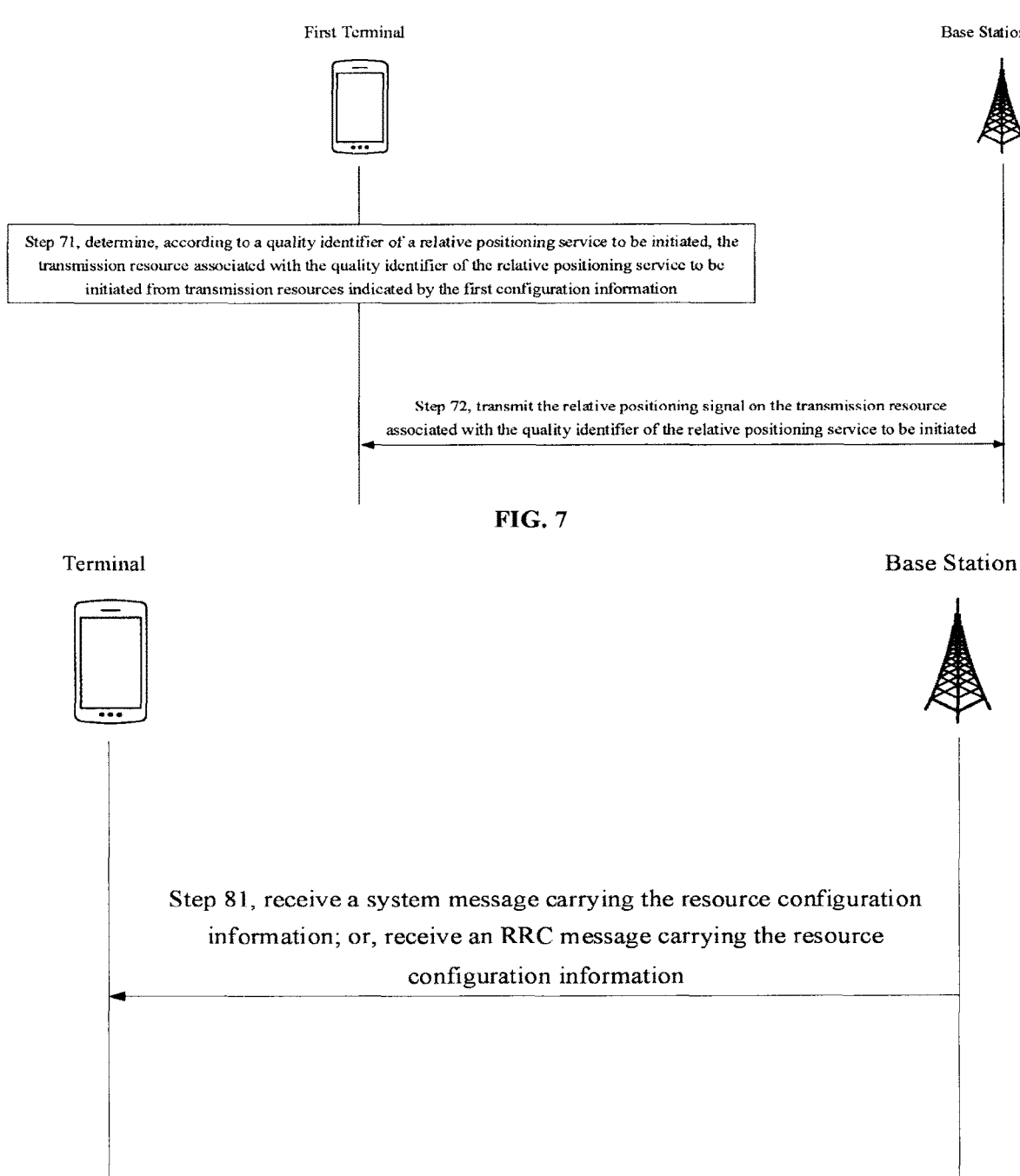

First Terminal

Base Station

Step 71, determine, according to a quality identifier of a relative positioning service to be initiated, the transmission resource associated with the quality identifier of the relative positioning service to be initiated from transmission resources indicated by the first configuration information Step 72, transmit the relative positioning signal on the transmission resource associated with the quality identifier of the relative positioning service to be initiated

FIG. 7

Terminal

Base Station

Step 81, receive a system message carrying the resource configuration information; or, receive an RRC message carrying the resource configuration information

FIG. 8

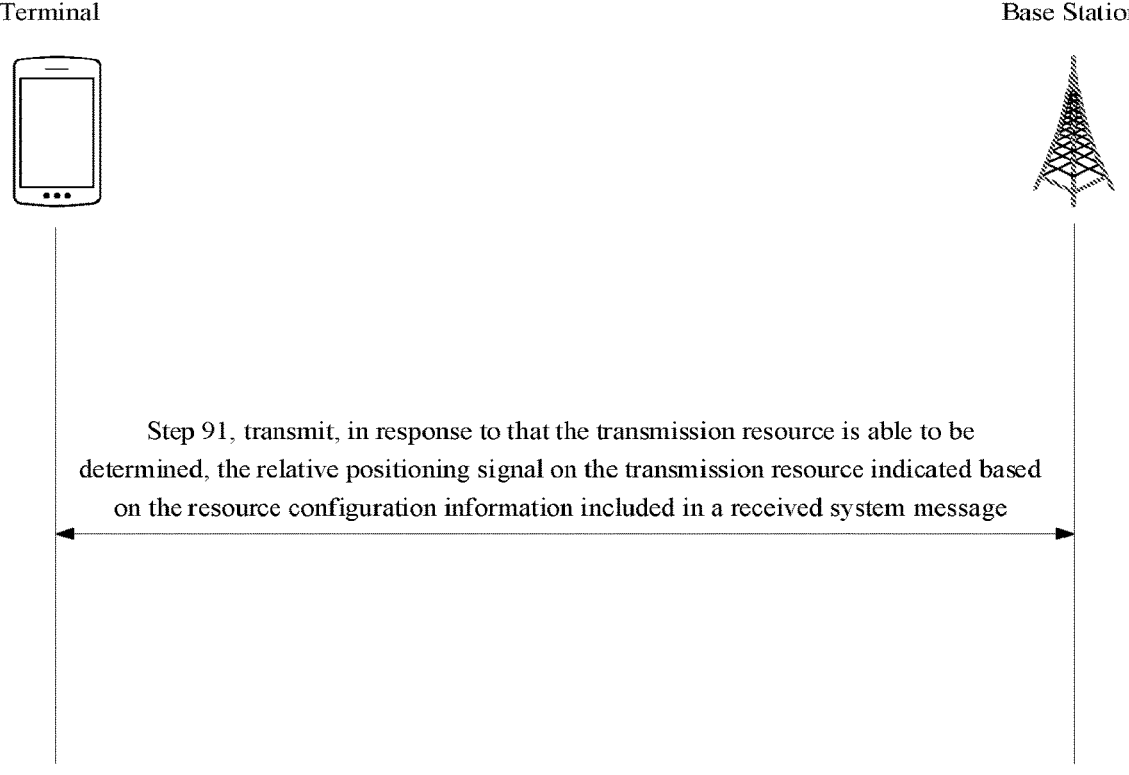

Terminal                                                              Base Station Step 91, transmit, in response to that the transmission resource is able to be
determined, the relative positioning signal on the transmission resource indicated based
on the resource configuration information included in a received system message

FIG. 9

Terminal                                                              Base Station Step 101, establish, in response to that the transmission resource is unable to
be determined, an RRC connection between the terminal and the base station

FIG. 10

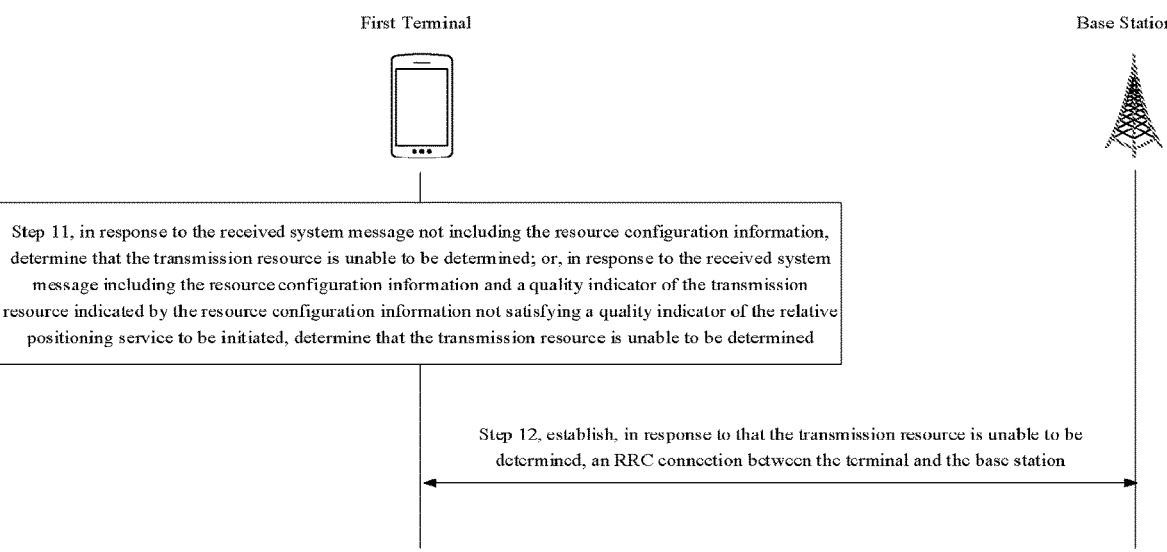

First Terminal                                                                                      Base Station Step 11, in response to the received system message not including the resource configuration information, determine that the transmission resource is unable to be determined; or, in response to the received system message including the resource configuration information and a quality indicator of the transmission resource indicated by the resource configuration information not satisfying a quality indicator of the relative positioning service to be initiated, determine that the transmission resource is unable to be determined Step 12, establish, in response to that the transmission resource is unable to be determined, an RRC connection between the terminal and the base station

FIG. 11

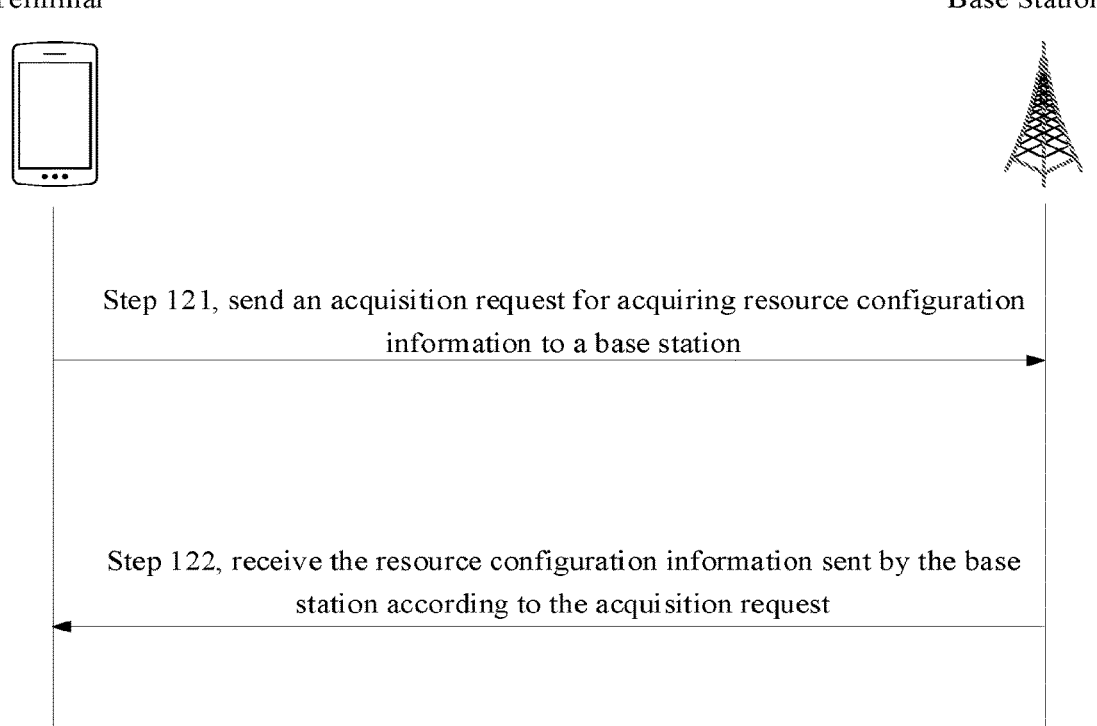

Terminal                                                                                      Base Station Step 121, send an acquisition request for acquiring resource configuration information to a base station Step 122, receive the resource configuration information sent by the base station according to the acquisition request

FIG. 12

METHOD AND APPARATUS FOR DETERMINING TRANSMISSION RESOURCE, AND COMMUNICATION DEVICE AND STORAGE MEDIUM

CROSS REFERENCE TO RELATED APPLICATION

This application is a National Stage of International Application No. PCT/CN2020/137000, filed on Dec. 16, 2020, which is incorporated by reference herein in its entireties for all purposes.

BACKGROUND

Description of the Related Art

Relative positioning between terminals brings users a good experience in many occasions. For example, in a large parking lot, the relative positioning between the mobile phone and the car facilitates the car owner to quickly determine the location of the car through the mobile phone.

In order to support direct communication between terminals, a sidelink communication mode is introduced. In the sidelink communication mode, the communication interface between terminals is PC-5. The transmission mode of sidelink communication between terminals may be one of the following: unicast, multicast and broadcast. During a relative positioning process between terminals, a sidelink may be used for transmission of a relative positioning signal.

SUMMARY

This disclosure relates to the field of wireless communication technologies, but is not limited thereto, and in particular, relates to a method, an apparatus, a communication device, and a storage medium for determining a transmission resource of a relative positioning signal.

Some embodiments of this disclosure disclose a method, an apparatus, a communication device, and a storage medium for determining a transmission resource of a relative positioning signal.

Some embodiments of this disclosure disclose a method for determining a transmission resource of a relative positioning signal, which is applied to a base station and can include sending resource configuration information. The resource configuration information is used for a terminal to determine the transmission resource for transmitting the relative positioning signal.

According to a second aspect of some embodiments of this disclosure, there is provided a method for determining a transmission resource of a relative positioning signal, which is applied to a terminal and can include receiving resource configuration information. The resource configuration information is used for the terminal to determine the transmission resource for transmitting the relative positioning signal.

According to a third aspect of some embodiments of this disclosure, there is provided an apparatus for determining a transmission resource of a relative positioning signal, which is applied to a terminal and includes a first sending module that is configured to send resource configuration information. The resource configuration information is used for a terminal to determine the transmission resource for transmitting the relative positioning signal.

According to a fourth aspect of some embodiments of this disclosure, there is provided an apparatus for determining a transmission resource of a relative positioning signal, which is applied to a terminal and includes a second receiving module that is configured to receive resource configuration information. The resource configuration information is used for the terminal to determine the transmission resource for transmitting the relative positioning signal.

According to a fifth aspect of some embodiments of this disclosure, there is provided a communication device including a processor and a memory for storing instructions executable by the processor. The processor is configured to, upon executing the executable instructions, implement the method described in any embodiment of this disclosure.

According to a sixth aspect of some embodiments of this disclosure, a computer storage medium is provided, where the computer storage medium stores a non-transitory program executable by a computer, and the executable program is used for, upon being executed by a processor, implementing the method described in any embodiment of this disclosure.

BRIEF DESCRIPTION OF THE DRAWINGS

Various exemplary embodiments of this disclosure that are proposed as examples will be described in detail with reference to the following figures, wherein like numerals reference like elements, and wherein:

FIG. 7 is a flowchart of a method for determining transmission resource of relative positioning signal according to some embodiments.

FIG. 8 is a flowchart of a method for determining transmission resource of relative positioning signal according to some embodiments.

FIG. 9 is a flowchart of a method for determining transmission resource of relative positioning signal according to some embodiments.

FIG. 10 is a flowchart of a method for determining transmission resource of relative positioning signal according to some embodiments.

FIG. 11 is a flowchart of a method for determining transmission resource of relative positioning signal according to some embodiments.

FIG. 12 is a flowchart of a method for determining transmission resource of relative positioning signal according to some embodiments.

DETAILED DESCRIPTION OF THE PREFERRED EMBODIMENTS

Exemplary embodiments will be described in detail herein, examples of which are illustrated in the accompanying drawings. Where the following description refers to the drawings, the same numerals in different drawings refer to the same or similar elements unless otherwise indicated. The implementations described in the following exemplary embodiments are not intended to represent all implementations consistent with embodiments of this disclosure. Instead, they are merely examples of the apparatus and method consistent with some aspects of the disclosed embodiments, as recited in the appended claims.

The terms used in some embodiments of this disclosure are only for the purpose of describing particular embodiments, and are not intended to limit some embodiments of this disclosure. As used in some embodiments of this disclosure and the appended claims, the singular forms "a" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, and the like may be used in some embodiments of this disclosure to describe various pieces of information, such information should not be limited to these terms. These terms are only used to distinguish the same type of information from each other. For example, without departing from the scope of some embodiments of this disclosure, the first information may also be referred to as the second information, and similarly, the second information may also be referred to as the first information. Depending on the context, the word "if" as used herein may be interpreted as "at the time of" or "when" or "in response to determining."

For the purpose of brevity and ease of understanding, the terms "greater than" or "less than" are used herein when characterizing the relationship of size. However, those skilled in the art can understand that the term "greater than" also covers the meaning of "greater than or equal to", and "less than" also covers the meaning of "less than or equal to".

Figure 1:
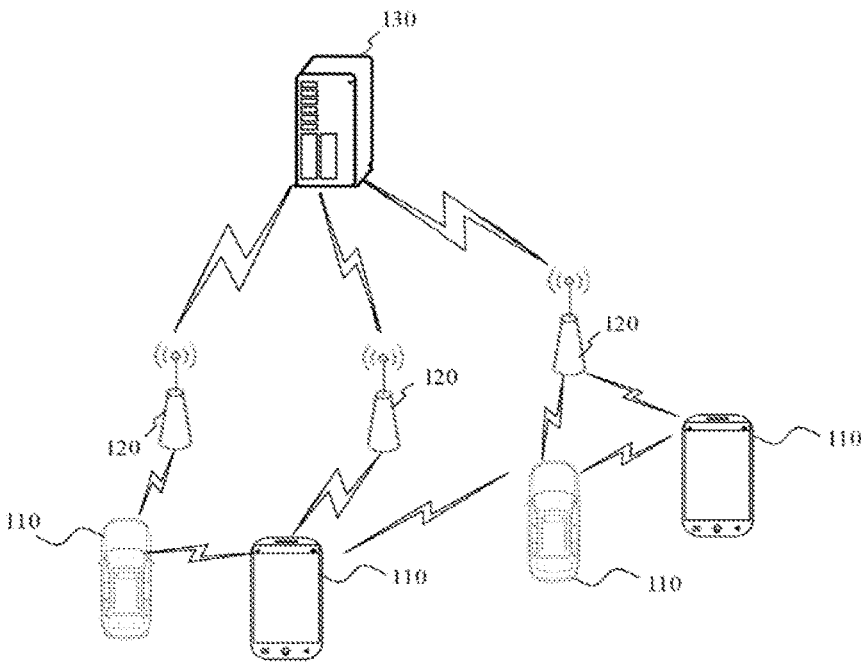
FIG. 1 is a schematic structural diagram of a wireless communication system.

Referring to FIG. 1, it shows a schematic structural diagram of a wireless communication system according to some embodiments of this disclosure. As shown in FIG. 1, the wireless communication system is a communication system based on cellular mobile communication technology, and the wireless communication system may include several UEs (user equipment) 110 and several base stations 120.

UE 110 may be a device that provides voice and/or data connectivity to the user. UE 110 may communicate with one or more core networks via a radio access network (RAN), and UE 110 may be IoT UE such as sensor devices, mobile phones (or "cellular" phones) and a computer with IoT UE. For example, it may be stationary, portable, pocket-sized, hand-held, computer-built or vehicle-mounted. For example, it may include station (STA), subscriber unit, subscriber station, mobile station, mobile site, remote station, access point, remote terminal, access terminal, user terminal, user agent, user device, or user equipment. Alternatively, UE 110 may also be a device of an unmanned aerial vehicle. Alternatively, UE 110 may also be an in-vehicle device, for example, a trip computer with a wireless communication function, or a wireless UE externally connected by the trip computer. Alternatively, UE 110 may also be a roadside device, for example, a street light, a signal light, or other roadside devices with a wireless communication function.

The base station 120 may be a network-side device in a wireless communication system. In some embodiments, the wireless communication system may be the 4th generation mobile communication (4G) system, also known as a long term evolution (LTE) system; or, the wireless communication system may also be the fifth generation mobile communication (5G) system, also known as new radio system or 5G NR System. Alternatively, the wireless communication system may also be a next-generation system of the 5G system. In some embodiments, the access network in the 5G system may be called new generation-radio access network (NG-RAN).

The base station 120 may be an evolved NodeB (eNB) used in the 4G system. Alternatively, the base station 120 may also be a gNB that adopts a centralized-distributed architecture in the 5G system. When the base station 120 adopts the centralized-distributed architecture, it usually includes a central unit (CU) and at least two distributed units (DU). The CU is provided with a protocol stack of a packet data convergence protocol (PDCP) layer, a radio link control (RLC) layer, and a media access control (MAC) layer; and the DU is provided with a physical (PHY) layer protocol stack. The specific implementation manner of the base station 120 is not limited in embodiments of this disclosure.

A wireless connection may be established between the base station 120 and the UE 110 through a wireless air interface. In different embodiments, the wireless air interface is a wireless air interface based on the 4G standard; or, the wireless air interface is a wireless air interface based on the 5G standard, for example, a new air interface; or, the wireless air interface may also be a wireless air interface based on a next-generation mobile communication network technology standard based on 5G.

In some embodiments, an end to end (E2E) connection may also be established between the UEs 110, for example, in the scenarios of vehicle to vehicle (V2V) communication, vehicle to infrastructure (V2I) communication, and vehicle to pedestrian (V2P) communication in the vehicle to everything (V2X) communication.

Here, the above-mentioned UE may be regarded as the terminal device of the following embodiments.

In some embodiments, the above wireless communication system may further include a network management device 130.

Several base stations 120 are respectively connected to the network management device 130. The network management device 130 may be a core network device in the wireless communication system. For example, the network management device 130 may be a mobility management entity (MME) in an evolved packet core (EPC) network. Alternatively, the network management device may also be other core network devices, such as a serving gateway (SGW), a public data network gateway (PGW), a policy and charging rule function (PCRF, home subscriber server (HSS), or the like. The implementation form of the network management device 130 is not limited in embodiments of this disclosure.

In order to facilitate the understanding of any embodiment of this disclosure, first, a relative positioning scenario between terminals will be described.

In order to support direct communication between terminals, the sidelink communication mode is introduced.

In some embodiments of the sidelink communication mode, the sidelink interface between terminals is PC-5.

In some embodiments of the sidelink communication mode, the allocation manner of transmission resources includes:

a first manner: the network dynamically schedules transmission resources; or, a second manner: the terminal autonomously selects transmission resources in a resource pool broadcasted by the base station.

In some embodiments, the base station may dynamically allocate sidelink transmission resources to the terminal according to the terminal's request.

In some embodiments, the terminal may randomly select sidelink transmission resources from the resource pool broadcasted or preconfigured by the base station.

In some embodiments, when performing relative positioning between terminals, sidelink is used for wireless communication.

In some embodiments, when the sidelink is used for communication and the terminal obtains transmission resources in the second manner, resource collision may occur when multiple terminals use the resources to perform sidelink communication, resulting in transmission collision.

In some embodiments, a collision avoidance mechanism is introduced for resource collisions occurring in the sidelink communication. The collision avoidance mechanism may minimize happening of the collisions.

In some embodiments, the collision avoidance mechanism includes at least one of the following: a resource reservation manner, a resource reservation awareness manner, and a listen before talk (LBT) manner.

In some embodiments, the terminal in the RRC idle state or the RRC inactive state needs to read a broadcast message of the base station. If the broadcast message contains a sidelink communication resource pool, the sidelink data transmission is carried out in an autonomous selection mode. Otherwise, the terminal needs to enter the RRC connected state, and send sidelink resource request information to the base station, so as to obtain transmission resources for sidelink communication.

In some embodiments, the terminal in the RRC connected state needs to send a sidelink terminal information (SidelinkUEInformation) message to the base station, where the SidelinkUEInformation message includes sidelink sending resource request information.

In some embodiments, the sidelink resource request information may correspond to a list, the list includes multiple elements, each element in the list may be information of sidelink transmission characteristics, and the information includes transmission mode, quality of service (QoS), target sending frequency and sidelink identifier of a peer terminal.

In some embodiments, if the first manner is adopted, the terminal sends a sidelink buffer status report (BSR) MAC control element (CE) to the base station, where the BSR MAC CE carries the peer terminal identifier and the buffer status corresponding thereto, and the peer terminal identifier is used for indicating the sidelink identifier of the peer terminal in the SidelinkUEInformation message.

In some embodiments, the base station may configure a sidelink receiving resource pool for the terminal through a broadcast or an RRC message, and the terminal performs sidelink communication on the resources in the receiving resource pool.

In some embodiments, the quality of service of the relative positioning service is affected by the available relative signaling transmission resources. For example, it may be affected by the sending bandwidth.

In some embodiments, when the terminal performs relative positioning, the initiating terminal sends an ultra-narrow pulse as an initial relative positioning signal. The feedback terminal, upon receiving the ultra-narrow pulse, feeds back another ultra-narrow pulse as a feedback relative positioning signal. The initiating terminal calculates a relative distance between the two terminals based on a time difference between the two signals. The terminal calculates a relative angle by measuring the angle of arrival (AOA) of the relative positioning signal, and implement the relative positioning between the terminals based on the relative distance and relative angle.

Since the resources used for sidelink communication are licensed spectrums of the operator, the resources will be reused. In this way, the network may need to be able to control the terminals to utilize the resources in an orderly manner, so as to reduce the interference to the wireless communication of other terminals.

Figure 2:
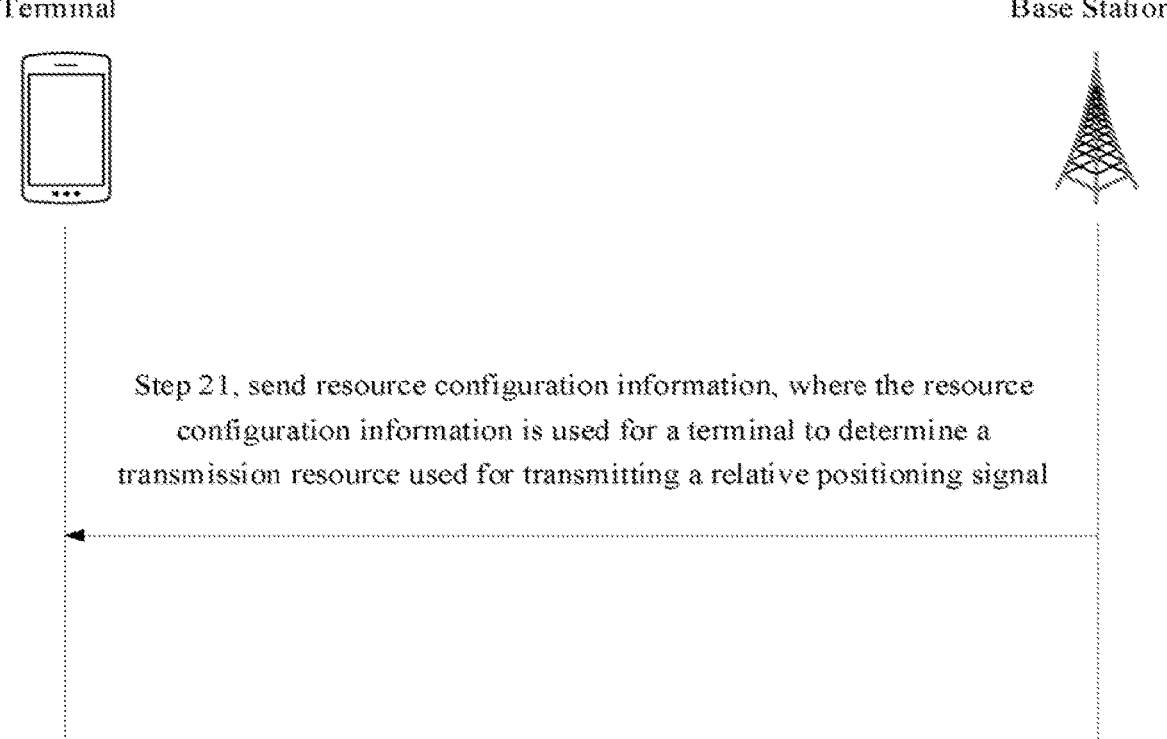
FIG. 2 is a flowchart of a method for determining transmission resource of relative positioning signal according to some embodiments.

As shown in FIG. 2, some embodiments of this disclosure provide a method for determining transmission resource of relative positioning signal, which is applied to a base station and includes following content.

In step 21, resource configuration information in sent.

The resource configuration information is used for a terminal to determine the transmission resource for transmitting the relative positioning signal.

In some embodiments, the relative positioning signal is a signal used for measuring a relative position between a first terminal and a second terminal during relative positioning.

The terminal may be, but is not limited to, a mobile phone, a wearable device, a vehicle-mounted terminal, a road side unit (RSU), a smart home terminal, and/or an industrial sensing device, and the like.

The base station is an interface device for the terminal to access the network.

The base station may be various types of base stations, for example, a base station in the third generation mobile communication (3G) network, a base station in the 4G network, a base station in the 5G network, or other evolved base station.

In some embodiments, measuring of the relative position between the first terminal and the second terminal may include measuring a distance between the first terminal and the second terminal and/or an azimuth angle of the second terminal relative to the first terminal.

Figures 3, 4:
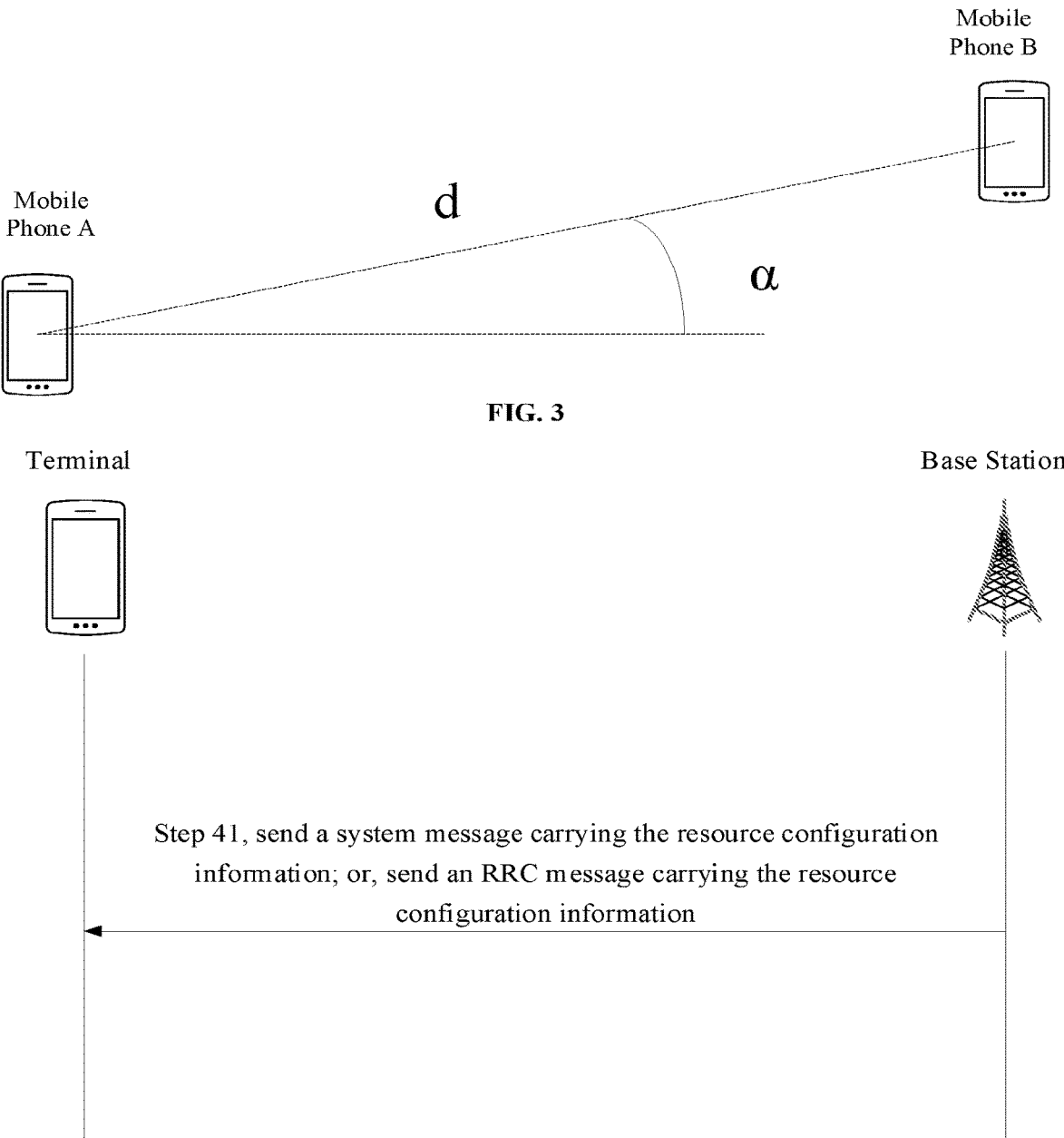
FIG. 3 is a schematic diagram showing the relative positioning according to some embodiments.
FIG. 4 is a flowchart of a method for determining transmission resource of relative positioning signal according to some embodiments.

For example, referring to FIG. 3, measuring of the relative position between the mobile phone A and the mobile phone B may include measuring the distance d between the mobile phone A and the mobile phone B and the azimuth angle α of the mobile phone B relative to the mobile phone A.

In some embodiments, the relative position between the first terminal and the second terminal may be determined by measuring the relative positioning signal transmitted on the sidelink.

In some embodiments, the transmission resource may include a resource for the terminal to receive the relative positioning signal, or a resource for the terminal to send the relative positioning signal.

In some embodiments, the transmission resource may include time domain and/or frequency domain resources on the licensed spectrum.

In some embodiments, referring to FIG. 3 again, the first terminal is terminal A, and the second terminal is terminal B. When performing relative positioning between terminal A and terminal B, based on the sidelink, the initiating terminal A sends an ultra-narrow pulse as the initial relative positioning signal. After receiving the initial relative positioning signal, the feedback terminal B feeds back another ultra-narrow pulse as the feedback relative positioning signal. The initiating terminal A calculates the relative distance d between the terminal A and the terminal B according to the time difference between sending the initial relative positioning signal and receiving the feedback relative positioning signal. Terminal A calculates the relative angle α by measuring the AOA of the feedback relative positioning signal. The relative positioning between the terminal A and the terminal B is performed based on the relative distance d and the relative angle α, so as to determine the relative position between the first terminal A and the second terminal B.

In some embodiments, in response to the need for relative positioning between the first terminal and the second terminal, the first terminal or the second terminal may obtain transmission resources for transmitting the relative positioning signal by sending a resource acquisition request to the base station.

In some embodiments, in response to receiving the acquisition request sent by the terminal for acquiring the resource configuration information, the base station sends to the terminal the resource configuration information with respect to the acquisition request.

In some embodiments, in response to a channel quality of the relative positioning signal transmission performed by the terminal being less than a quality threshold, the terminal sends the acquisition request for acquiring the resource configuration information to the base station. In some embodiments, transmission of the relative positioning signal may be performed by randomly selecting transmission resources from a resource pool.

In some embodiments, in response to establishment of an RRC connection between the terminal and the base station, the terminal sends the acquisition request for acquiring the resource configuration information to the base station.

In some embodiments, in response to the terminal starting an application of relative positioning, the terminal sends the acquisition request for acquiring the resource configuration information to the base station.

In this way, the terminal can obtain the transmission resources for transmitting the relative positioning signal in time.

In some embodiments, resources may be scheduled through a unified resource scheduling algorithm, so as to reduce interference caused by resource collision when transmission of relative positioning signals are performed between different terminals, thereby improving channel communication quality.

In some embodiments, the base station may broadcast the resource pool to the terminal, and the terminal may transmit the relative positioning signal on a randomly selected transmission resource in the resource pool.

In some embodiments, the resource pool may be preconfigured, and the terminal may transmit the relative positioning signal on transmission resources randomly selected in the preconfigured resource pool.

In some embodiments, in order to mitigate the resource collision caused by respective terminals randomly selecting resources from the resource pool to perform sidelink wireless communication, a collision avoidance function may be enabled. In some embodiments, the collision avoidance function includes at least one of the following: resource reservation, resource reservation awareness and LBT.

In some embodiments, the resource configuration information may indicate the transmission resource for the terminal to transmit the relative positioning signal.

For example, the resource configuration information may carry information on time domain location and/or frequency domain location of the transmission resource.

In some embodiments, the resource configuration information may indicate a manner of acquiring the transmission resource of the relative positioning signal transmitted by the terminal.

For example, the resource configuration information may carry indication information indicating that the transmission resource is obtained from the resource pool.

In some embodiments, the resource configuration information not only indicates the transmission resource for the terminal to transmit the relative positioning signal, but also indicates the manner of acquiring the transmission resource from the resource pool.

In some embodiments, if the base station is deployed with a low density in an area (e.g., mountainous areas, oceans, or the like), and the resource configuration information indicates both the transmission resource for the terminal to transmit the relative positioning signal and the manner of acquiring the transmission resource from the resource pool, the terminal transmits the relative positioning signal by preferentially using the transmission resource selected from the resource pool when performing the relative positioning by means of sidelink.

In some embodiments, the base station sends the resource configuration information through a broadcast message; or, the base station sends the resource configuration information through an RRC reconfiguration message.

In this way, the resource configuration information may be sent through an existing broadcast message or RRC reconfiguration message, thereby improving the signaling compatibility of the broadcast message or the RRC reconfiguration message.

In some embodiments of this disclosure, the terminal may determine, based on the resource configuration information, the transmission resource of the relative positioning signal used when measuring the relative position between the terminals, and transmit the relative positioning signal by using the determined transmission resource. Since the transmission resource for the terminal to transmit the relative positioning signal is configured by the base station for the terminal, on the one hand, the relative positioning signal is transmitted by configuring the transmission resource by the base station, the transmission conflict, which may be caused when the relative positioning signal is transmitted by different terminals using multiplexed resources, can be mitigated; on the other hand, the base station can configure different transmission resources for different terminals, so the transmission resources used by the terminals to transmit the relative positioning signal can be configured more flexibly.

It should be noted, those skilled in the art can understand that the method according to some embodiments of this disclosure may be implemented alone, or may be implemented together with other methods according to some other embodiments of this disclosure or some methods in related art.

In some embodiments, the resource configuration information includes at least one of the following: first configuration information indicating the transmission resource; and second configuration information indicating a manner of acquiring the transmission resource.

In some embodiments, the first configuration information indicates a time-frequency domain resource location of the transmission resource. In some embodiments, the time-frequency domain resource location includes time domain and/or frequency domain resource locations.

In some embodiments, the base station may schedule resources through a unified resource scheduling algorithm, and determine the time domain and/or frequency domain resource locations of the transmission resource. In this way, interference caused by resource collision when transmitting relative positioning signals between different terminals can be reduced, thereby improving the channel communication quality.

In some embodiments, the second configuration information indicates the terminal to multiplex transmission resources in a resource pool, where the resource pool includes transmission resources for the terminal to perform sidelink communication.

In some embodiments, the transmission resources for sidelink communication may refer to transmission resources for transmitting data using sidelink.

In some embodiments, the base station may broadcast the resource pool to the terminal, and the terminal may transmit data on transmission resources randomly selected in the resource pool broadcast by the network.

In some embodiments, the resource pool may be preconfigured, and the terminal may transmit data on transmission resources randomly selected in the preconfigured resource pool.

In some embodiments, the transmission resource is associated with a quality identifier of a relative positioning service where the quality identifier indicates a quality indicator of the relative positioning service.

In some embodiments, the quality indicators of different relative positioning services are different.

In some embodiments, different transmission resources are used for transmitting relative positioning signals of relative positioning services with different quality indicators.

In some embodiments, when a quality indicator indicated by a quality identifier associated with the transmission resource satisfies the quality indicator of the relative positioning service for sending the relative positioning signal, the transmission resource can be used for sending the relative positioning signal of the relative positioning service.

In some embodiments, when the quality indicator indicated by the quality identifier associated with the transmission resource does satisfy the quality indicator of the relative positioning service for sending the relative positioning signal, the transmission resource cannot be used for sending the relative positioning signal of the relative positioning service.

In some embodiments, the terminal may select, from multiple sets of transmission resources, a transmission resource whose associated quality indicator satisfies the quality indicator required by the relative positioning service for sending the relative positioning signal.

In some embodiments, a mapping relationship between transmission resources and quality identifiers may be carried in the resource configuration information.

As shown in FIG. 4, some embodiments of this disclosure provide a method for determining transmission resource of relative positioning signal, which is applied to a base station and includes following content.

In step 41, a system message carrying the resource configuration information is sent; or, an RRC message carrying the resource configuration information is sent.

In this way, the resource configuration information is sent through the existing message, thereby improving the signaling compatibility of this message.

Some embodiments of this disclosure provide a method for determining transmission resource of relative positioning signal, including receiving an acquisition request for acquiring the resource configuration information sent by a first type terminal, and sending the resource configuration information to the first type terminal according to the acquisition request.

It should be noted, those skilled in the art can understand that the method according to some embodiments of this disclosure may be implemented alone, or may be implemented together with other methods according to some other embodiments of this disclosure or some methods in related art.

Figure 5:
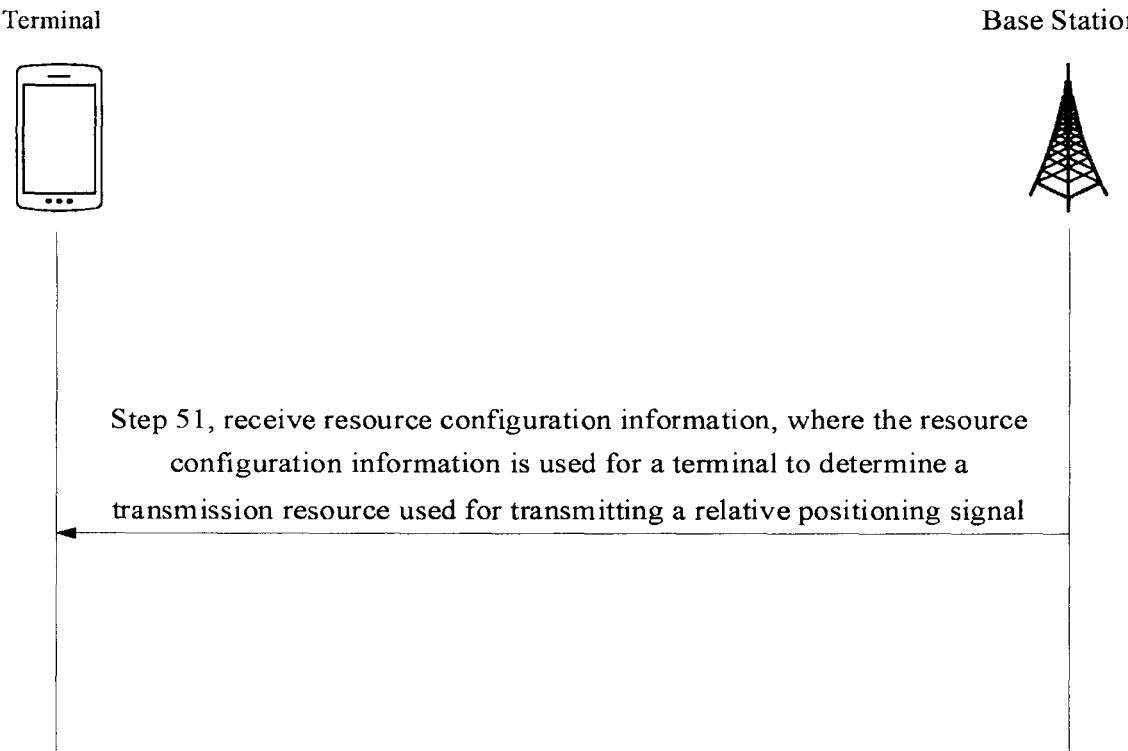
FIG. 5 is a flowchart of a method for determining transmission resource of relative positioning signal according to some embodiments.

As shown in FIG. 5, some embodiments of this disclosure provide a method for determining transmission resource of relative positioning signal, which is applied to a terminal and includes following content.

In step 51, resource configuration information is received.

The resource configuration information is used for the terminal to determine the transmission resource for transmitting the relative positioning signal.

In some embodiments, the relative positioning signal is a signal used for measuring a relative position between a first terminal and a second terminal during relative positioning.

The terminal may be, but is not limited to, a mobile phone, a wearable device, a vehicle-mounted terminal, an RSU, a smart home terminal, and/or an industrial sensing device, and the like.

In some embodiments, the terminal may receive the resource configuration information sent by a base station.

The base station is an interface device for the terminal to access the network. The base station may be various types of base stations, for example, a base station in the 3G network, a base station in the 4G network, a base station in the 5G network, or other evolved base station.

In some embodiments, measuring of the relative position between the first terminal and the second terminal may include measuring a distance between the first terminal and the second terminal and/or an azimuth angle of the second terminal relative to the first terminal.

For example, referring to FIG. 3 again, measuring of the relative position between the mobile phone A and the mobile phone B may include measuring the distance d between the mobile phone A and the mobile phone B and the azimuth angle α of the mobile phone B relative to the mobile phone A.

In some embodiments, the relative position between the first terminal and the second terminal may be determined by measuring the relative positioning signal transmitted on the sidelink.

In some embodiments, the transmission resource may include a resource for the terminal to receive the relative positioning signal, or a resource for the terminal to send the relative positioning signal.

In some embodiments, the transmission resource may include time domain and/or frequency domain resources that are licensed.

In some embodiments, referring to FIG. 3 again, the first terminal is terminal A, and the second terminal is terminal B. When performing relative positioning between terminal A and terminal B, based on the sidelink, the initiating terminal A sends an ultra-narrow pulse as the initial relative positioning signal. After receiving the initial relative positioning signal, the feedback terminal B feeds back another ultra-narrow pulse as the feedback relative positioning signal. The initiating terminal A calculates the relative distance d between the terminal A and the terminal B according to the time difference between sending the initial relative positioning signal and receiving the feedback relative positioning signal. Terminal A calculates the relative angle α by measuring the AOA of the feedback relative positioning signal. The relative positioning between the terminal A and the terminal B is performed based on the relative distance d and the relative angle α, so as to determine the relative position between the first terminal A and the second terminal B.

In some embodiments, in response to the need for relative positioning between the first terminal and the second terminal, the first terminal or the second terminal may obtain transmission resources for transmitting the relative positioning signal by sending a resource acquisition request to the base station.

In some embodiments, in response to receiving the acquisition request sent by the terminal for acquiring the resource configuration information, the base station sends to the terminal the resource configuration information with respect to the acquisition request.

In some embodiments, in response to a channel quality of the relative positioning signal transmission performed by the terminal being less than a quality threshold, the terminal sends the acquisition request for acquiring the resource configuration information to the base station. In some embodiments, transmission of the relative positioning signal may be performed by randomly selecting transmission resources from a resource pool.

In some embodiments, in response to establishment of an RRC connection between the terminal and the base station, the terminal sends the acquisition request for acquiring the resource configuration information to the base station.

In some embodiments, in response to the terminal starting an application of relative positioning, the terminal sends the acquisition request for acquiring the resource configuration information to the base station.

In some embodiments, in response to establishment of an RRC connection between the terminal and the base station, the terminal sends the acquisition request for acquiring the resource configuration information to the base station.

In this way, the terminal can obtain the transmission resources for transmitting the relative positioning signal in time.

In some embodiments, resources may be scheduled through a unified resource scheduling algorithm, so as to reduce interference caused by resource collision when transmission of relative positioning signals are performed between different terminals, thereby improving channel communication quality.

In some embodiments, the base station may broadcast the resource pool to the terminal, and the terminal may transmit the relative positioning signal on a randomly selected transmission resource in the resource pool.

In some embodiments, the resource pool may be preconfigured, and the terminal may transmit the relative positioning signal on transmission resources randomly selected in the preconfigured resource pool.

In some embodiments, in order to mitigate the resource collision caused by respective terminals randomly selecting resources from the resource pool to perform sidelink wireless communication, a collision avoidance function may be enabled. In some embodiments, the collision avoidance function includes at least one of the following: resource reservation, resource reservation awareness and LBT.

In some embodiments, the resource configuration information may indicate the transmission resource for the terminal to transmit the relative positioning signal.

For example, the resource configuration information may carry information on time domain location and/or frequency domain location of the transmission resource.

In some embodiments, the resource configuration information may indicate a manner of acquiring the transmission resource of the relative positioning signal transmitted by the terminal.

For example, the resource configuration information may carry indication information indicating that the transmission resource is obtained from the resource pool.

In some embodiments, the resource configuration information not only indicates the transmission resource for the terminal to transmit the relative positioning signal, but also indicates the manner of acquiring the transmission resource from the resource pool.

In some embodiments, if the base station is deployed with a low density in an area (that is an area with low deployment density of base stations, e.g., mountainous areas, oceans, or the like), and the resource configuration information indicates both the transmission resource for the terminal to transmit the relative positioning signal and the manner of acquiring the transmission resource from the resource pool, the terminal transmits the relative positioning signal by preferentially using the transmission resource selected from the resource pool when performing the relative positioning by means of sidelink.

In some embodiments, the base station sends the resource configuration information through a broadcast message; or, the base station sends the resource configuration information through an RRC reconfiguration message.

In this way, the resource configuration information may be sent through an existing broadcast message or RRC reconfiguration message, thereby improving the signaling compatibility of the broadcast message or the RRC reconfiguration message.

In some embodiments of this disclosure, the terminal may determine, based on the resource configuration information, the transmission resource of the relative positioning signal used when measuring the relative position between the terminals, and transmit the relative positioning signal by using the determined transmission resource. Since the transmission resource for the terminal to transmit the relative positioning signal is configured by the base station for the terminal, on the one hand, the relative positioning signal is transmitted by configuring the transmission resource by the base station, the transmission conflict, which may be caused when the relative positioning signal is transmitted by different terminals using multiplexed resources, can be mitigated; on the other hand, the base station can configure different transmission resources for different terminals, so the transmission resources used by the terminals to transmit the relative positioning signal can be configured more flexibly.

It should be noted, those skilled in the art can understand that the method according to some embodiments of this disclosure may be implemented alone, or may be implemented together with other methods according to some other embodiments of this disclosure or some methods in related art.

In some embodiments, the resource configuration information includes at least one of the following: first configuration information indicating the transmission resource; and second configuration information indicating a manner of acquiring the transmission resource.

In some embodiments, the first configuration information indicates a time-frequency domain resource location of the transmission resource. In some embodiments, the time-frequency domain resource location includes time domain and/or frequency domain resource locations.

In some embodiments, the base station may schedule resources through a unified resource scheduling algorithm, and determine the time domain and/or frequency domain resource locations of the transmission resource. In this way, interference caused by resource collision when transmitting relative positioning signals between different terminals can be reduced, thereby improving the channel communication quality.

In some embodiments, the second configuration information indicates the terminal to multiplex transmission resources in a resource pool, where the resource pool includes transmission resources for the terminal to perform sidelink communication.

Figure 6:
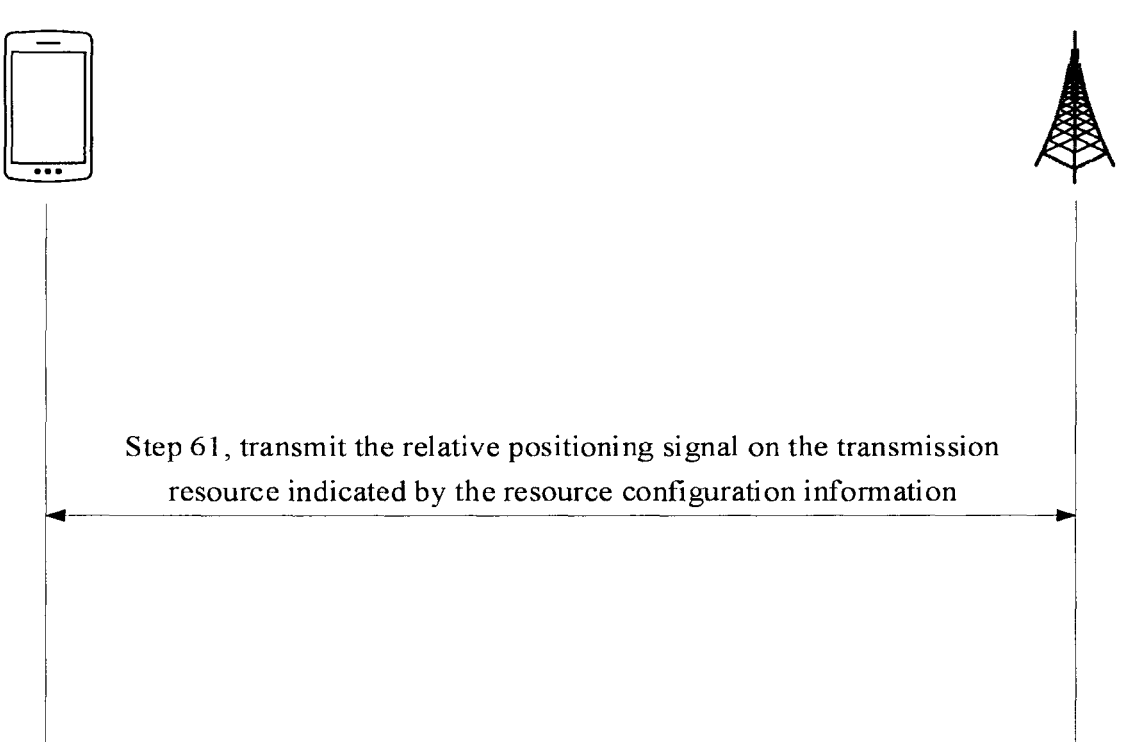
FIG. 6 is a flowchart of a method for determining transmission resource of relative positioning signal according to some embodiments.

As shown in FIG. 6, some embodiments of this disclosure provide a method for determining transmission resource of relative positioning signal, which is applied to a terminal and includes following content.

In step 61, the relative positioning signal is transmitted on the transmission resource indicated by the resource configuration information.

In some embodiments, the resource configuration information may indicate the transmission resource for the terminal to transmit the relative positioning signal.

For example, the resource configuration information may carry information on time domain location and/or frequency domain location of the transmission resource.

In some embodiments, the resource configuration information may indicate a manner of acquiring the transmission resource of the relative positioning signal transmitted by the terminal.

For example, the resource configuration information may carry indication information indicating that the transmission resource is obtained from the resource pool.

In some embodiments, the resource configuration information not only indicates the transmission resource for the terminal to transmit the relative positioning signal, but also indicates the manner of acquiring the transmission resource from the resource pool.

In some embodiments, if the base station is deployed with a low density in an area (e.g., mountainous areas, oceans, or the like), and the resource configuration information indicates both the transmission resource for the terminal to transmit the relative positioning signal and the manner of acquiring the transmission resource from the resource pool, the terminal transmits the relative positioning signal by preferentially using the transmission resource selected from the resource pool when performing the relative positioning by means of sidelink.

It should be noted, those skilled in the art can understand that the method according to some embodiments of this disclosure may be implemented alone, or may be implemented together with other methods according to some other embodiments of this disclosure or some methods in related art.

As shown in FIG. 7, some embodiments of this disclosure provide a method for determining transmission resource of relative positioning signal, which is applied to a terminal and includes following content.

In step 71, according to a quality identifier of a relative positioning service to be initiated, the transmission resource associated with the quality identifier of the relative positioning service to be initiated is determined from transmission resources indicated by the first configuration information.

In step 72, the relative positioning signal is transmitted on the transmission resource associated with the quality identifier of the relative positioning service to be initiated.

In some embodiments, the first configuration information indicates the time-frequency domain resource location of the transmission resource.

In some embodiments, the transmission resource is associated with the quality identifier of the relative positioning service, where the quality identifier indicates the quality indicator of the relative positioning service.

In some embodiments, the quality indicators of different relative positioning services are different.

In some embodiments, different transmission resources are used for transmitting relative positioning signals of relative positioning services with different quality indicators.

In some embodiments, when a quality indicator indicated by a quality identifier associated with the transmission resource satisfies the quality indicator of the relative positioning service for sending the relative positioning signal, the transmission resource can be used for sending the relative positioning signal of the relative positioning service.

In some embodiments, when the quality indicator indicated by the quality identifier associated with the transmission resource does satisfy the quality indicator of the relative positioning service for sending the relative positioning signal, the transmission resource cannot be used for sending the relative positioning signal of the relative positioning service.

In some embodiments, the terminal may select, from multiple sets of transmission resources, a transmission resource whose associated quality indicator satisfies the quality indicator required by the relative positioning service for sending the relative positioning signal.

In some embodiments, a mapping relationship between transmission resources and quality identifiers may be carried in the resource configuration information.

In some embodiments, the second configuration information indicates the terminal to multiplex transmission resources in a resource pool, where the resource pool includes transmission resources for the terminal to perform sidelink communication.

In some embodiments, the transmission resources for sidelink communication may refer to transmission resources for transmitting data using sidelink.

In some embodiments, the base station may broadcast the resource pool to the terminal, and the terminal may transmit data on transmission resources randomly selected in the resource pool broadcast by the network.

In some embodiments, the resource pool may be preconfigured, and the terminal may transmit data on transmission resources randomly selected in the preconfigured resource pool.

It should be noted, those skilled in the art can understand that the method according to some embodiments of this disclosure may be implemented alone, or may be implemented together with other methods according to some other embodiments of this disclosure or some methods in related art.

As shown in FIG. 8, some embodiments of this disclosure provide a method for determining transmission resource of relative positioning signal, which is applied to a terminal and includes following content.

In step 81, a system message carrying the resource configuration information is received; or, an RRC message carrying the resource configuration information is received.

In this way, the resource configuration information is sent through the existing message, thereby improving the signaling compatibility of this message.

It should be noted, those skilled in the art can understand that the method according to some embodiments of this disclosure may be implemented alone, or may be implemented together with other methods according to some other embodiments of this disclosure or some methods in related art.

As shown in FIG. 9, some embodiments of this disclosure provide a method for determining transmission resource of relative positioning signal, which is applied to a terminal. The terminal is in an RRC disconnected state, and the RRC disconnected state includes an RRC idle state and an RRC inactive state. The method includes following content.

In step 91, in response to that the transmission resource is able to be determined, the relative positioning signal is transmitted on the transmission resource indicated based on the resource configuration information included in a received system message.

In some embodiments, in response to the received system message including the resource configuration information, it is determined that the transmission resource is able to be determined.

In some embodiments, in response to the received system message including the resource configuration information and a quality indicator of the transmission resource indicated by the resource configuration information satisfying a quality indicator of the relative positioning service to be initiated, it is determined that the transmission resource is able to be determined. In response to the received system message not including the resource configuration information or the quality indicator of the transmission resource indicated by the resource configuration information not satisfying the quality indicator of the relative positioning service to be initiated, it is determined that the transmission resource is unable to be determined.

It should be noted, those skilled in the art can understand that the method according to some embodiments of this disclosure may be implemented alone, or may be implemented together with other methods according to some other embodiments of this disclosure or some methods in related art.

As shown in FIG. 10, some embodiments of this disclosure provide a method for determining transmission resource of relative positioning signal, which is applied to a terminal and includes following content.

In step 101, in response to that the transmission resource is unable to be determined, an RRC connection is established between the terminal and the base station.

In some embodiments, after the RRC connection is established between the terminal and the base station, the resource configuration information is obtained from the base station.

In some embodiments, the transmission resource may be determined according to the resource configuration information.

In some embodiments, the resource configuration information may indicate the transmission resource for the terminal to transmit the relative positioning signal.

For example, the resource configuration information may carry information on time domain location and/or frequency domain location of the transmission resource.

In some embodiments, the resource configuration information may indicate an manner of acquiring the transmission resource of the relative positioning signal transmitted by the terminal.

For example, the resource configuration information may carry indication information indicating that the transmission resource is acquired from the resource pool.

In some embodiments, the resource configuration information may indicate not only the transmission resource for the terminal to transmit the relative positioning signal, but also the manner of acquiring the transmission resource from the resource pool.

It should be noted, those skilled in the art can understand that the method according to some embodiments of this disclosure may be implemented alone, or may be implemented together with other methods according to some other embodiments of this disclosure or some methods in related art.

As shown in FIG. 11, some embodiments of this disclosure provide a method for determining transmission resource of relative positioning signal, which is applied to a terminal and includes following content.

In step 11, in response to the received system message not including the resource configuration information, it is determined that the transmission resource is unable to be determined; or, in response to the received system message including the resource configuration information and a quality indicator of the transmission resource indicated by the resource configuration information not satisfying a quality indicator of the relative positioning service to be initiated, it is determined that the transmission resource is unable to be determined. In step 12, in response to that the transmission resource is unable to be determined, an RRC connection is established between the terminal and the base station.

It should be noted, those skilled in the art can understand that the method according to some embodiments of this disclosure may be implemented alone, or may be implemented together with other methods according to some other embodiments of this disclosure or some methods in related art.

As shown in FIG. 12, some embodiments of this disclosure provide a method for determining transmission resource of relative positioning signal, where the terminal is a first-type terminal, the terminal is in an RRC connected state; and the method applied to the terminal includes following content.

In step 121, an acquisition request for acquiring resource configuration information is sent to a base station.

In step 122, the resource configuration information sent by the base station according to the acquisition request is received.

In some embodiments, in response to a channel quality of the relative positioning signal transmission, which is to be performed by the terminal by randomly selecting transmission resource from a resource pool, being less than a quality threshold, the terminal sends the acquisition request for acquiring the resource configuration information to the base station.

In some embodiments, in response to establishment of an RRC connection between the terminal and the base station, the terminal sends the acquisition request for acquiring the resource configuration information to the base station.

In some embodiments, in response to the terminal starting an application of relative positioning, the terminal sends the acquisition request for acquiring the resource configuration information to the base station.

In some embodiments, the acquisition request includes at least one piece of request information, where each piece of the request information is used for requesting to acquire the transmission resource of a type of relative positioning signal.

In some embodiments, the request information includes at least one of the following information: a relative positioning indication, an identity of a peer terminal used for positioning of the terminal, a quality identifier of a relative positioning service, and a transmission cycle of the relative positioning signal.

In some embodiments, if a terminal in the connected state needs to send the relative positioning signal, it may send the acquisition request to the base station.

In some embodiments, the acquisition request carries a list, where each element in the list includes request information of the transmission resource for sending the relative positioning signal. Each piece of the request information may include auxiliary information such as an identity of the peer terminal to perform relative positioning, a quality identifier of the relative positioning service, and a transmission cycle of the relative positioning signal.

In some embodiments, the list may be implemented by reusing a sending resource request list of sidelink data communication, and the list carries the relative positioning indication. Here, the relative positioning indication is used for the base station to distinguish whether the requested transmission resource is for the sidelink data communication or the relative positioning signal.

It should be noted, those skilled in the art can understand that the method according to some embodiments of this disclosure may be implemented alone, or may be implemented together with other methods according to some other embodiments of this disclosure or some methods in related art.

Figure 13:
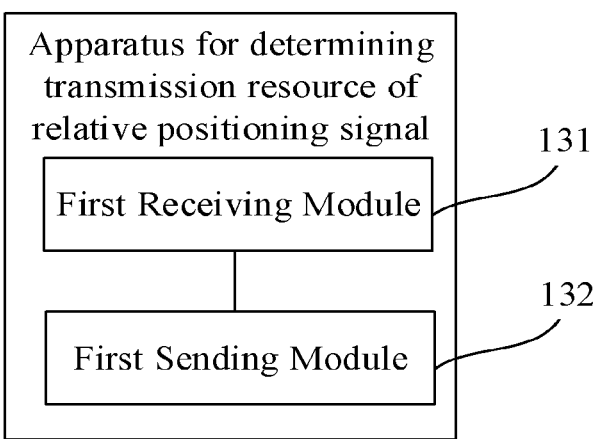
FIG. 13 is a block diagram of an apparatus for determining transmission resource of relative positioning signal according to some embodiments.

As shown in FIG. 13, some embodiments of this disclosure provide an apparatus for determining transmission resource of relative positioning signal, which is applied to a base station and includes a first sending module 131.

The first sending module 131 is configured to send resource configuration information.

The resource configuration information is used for the terminal to determine the transmission resource for transmitting the relative positioning signal.

In some embodiments, the resource configuration information includes at least one of the following: first configuration information indicating the transmission resource; and second configuration information indicating a manner of acquiring the transmission resource.

In some embodiments, the first configuration information indicates a time-frequency domain resource location of the transmission resource.

In some embodiments, the second configuration information indicates the terminal to multiplex transmission resources in a resource pool, and the resource pool includes the transmission resources for the terminal to perform a sidelink communication.

In some embodiments, the transmission resource is associated with a quality identifier of a relative positioning service, and the quality identifier indicates a quality indicator of the relative positioning service.

In some embodiments, the first sending module 131 is further configured to send a system message carrying the resource configuration information, or send an RRC message carrying the resource configuration information.

In some embodiments, the terminal is a first type terminal, and the apparatus further includes a first receiving module 132.

The first receiving module 132 is configured to receive an acquisition request for acquiring the resource configuration information sent by the first type terminal.

The first sending module 131 is further configured to send the resource configuration information to the first type terminal according to the acquisition request.

It should be noted, those skilled in the art can understand that the method according to some embodiments of this disclosure may be implemented alone, or may be implemented together with other methods according to some other embodiments of this disclosure or some methods in related art.

Figure 14:
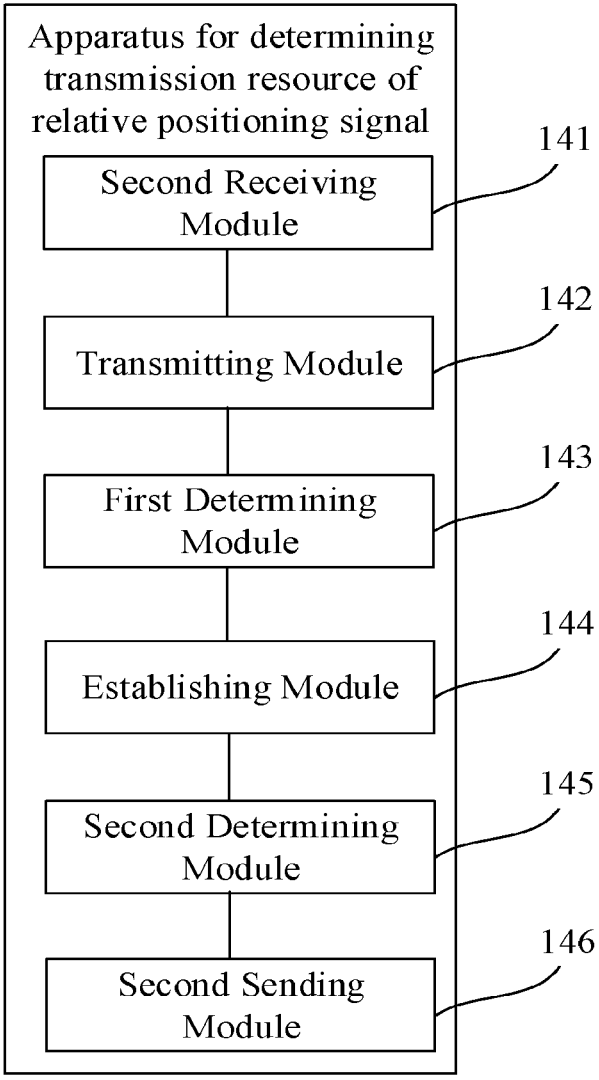
FIG. 14 is a block diagram of an apparatus for determining transmission resource of relative positioning signal according to some embodiments.

As shown in FIG. 14, some embodiments of this disclosure provide an apparatus for determining transmission resource of relative positioning signal, which is applied to a terminal and includes a second receiving module 14.

The second receiving module 141 is configured to receive resource configuration information.

The resource configuration information is used for the terminal to determine the transmission resource for transmitting the relative positioning signal.

In some embodiments, the resource configuration information includes at least one of: first configuration information indicating the transmission resource, and second configuration information indicating a manner of acquiring the transmission resource.

In some embodiments, the apparatus further includes a transmitting module 142.

The transmitting module 142 is further configured to: transmit the relative positioning signal on the transmission resource indicated by the resource configuration information.

In some embodiments, the first configuration information indicates a time-frequency domain resource location of the transmission resource.

In some embodiments, the transmission resource is associated with a quality identifier of a relative positioning service, and the quality identifier indicates a quality indicator of the relative positioning service.

In some embodiments, the apparatus further includes a first determining module 143.

The first determining module 143 is configured to determine, according to a quality identifier of a relative positioning service to be initiated, a transmission resource associated with the quality identifier of the relative positioning service to be initiated from the transmission resource indicated by the first configuration information.

The transmitting module 142 is further configured to transmit the relative positioning signal on the transmission resource associated with the quality identifier of the relative positioning service to be initiated.

In some embodiments, the second configuration information indicates the terminal to multiplex transmission resources in a resource pool, and the resource pool includes the transmission resources for the terminal to perform a sidelink communication.

In some embodiments, the second receiving module 141 is further configured to receive a system message carrying the resource configuration information, or receive an RRC message carrying the resource configuration information.

In some embodiments, the terminal is in an RRC disconnected state, the RRC disconnected state includes an RRC idle state and an RRC inactive state, and the transmitting module 142 is further configured to transmit, in response to being able to determine the transmission resource, the relative positioning signal on the transmission resource indicated based on the resource configuration information contained in a received system message.

In some embodiments, the apparatus further includes a establishing module 144, where the establishing module 144 is further configured to establish, in response to being unable to determine the transmission resource, an RRC connection between the terminal and a base station.

In some embodiments, the apparatus further includes a second determining module 145.

The second determining module 145 is further configured to determine, in response to the received system message not including the resource configuration information, that the transmission resource is unable to be determined or determine, in response to the received system message including the resource configuration information and a quality indicator of the transmission resource indicated by the resource configuration information not meeting a quality indicator of a relative positioning service to be initiated, that the transmission resource is unable to be determined.

In some embodiments, the terminal is the first type terminal, the terminal is in an RRC connected state, the apparatus further includes a second sending module 146, and the second sending module 146 is configured to send a second acquisition request for acquiring the transmission resource to the base station.

The second receiving module 141 is further configured to receive the resource configuration information sent by the base station according to the second acquisition request.

In some embodiments, the acquisition request includes at least one piece of request information, and each piece of the request information is used for requesting to acquire the transmission resource for one type of relative positioning signal.

In some embodiments, the request information comprises information on at least one of following: a relative positioning indication, an identity of a peer terminal used for positioning of the terminal, a quality identifier of a relative positioning service, and a transmission cycle of the relative positioning signal.

Regarding the apparatus in the above-mentioned embodiments, the specific manner in which each module performs the operation has been described in detail in some embodiments of the method, and will not be described in detail here.

It should be noted, those skilled in the art can understand that the method according to some embodiments of this disclosure may be implemented alone, or may be implemented together with other methods according to some other embodiments of this disclosure or some methods in related art.

Some embodiments of this disclosure provide a communication device, and the communication device includes a processor and a memory for storing non-transitory computer readable instructions executable by the processor. The processor is configured to, upon executing the executable instructions, implement the method according to any embodiment of this disclosure.

The processor may include various types of storage medium, which may be non-transitory computer storage medium that can continue to memorize and store information on the communication device after the power is off.

The processor may be connected to the memory through a bus or the like, and is configured to read the executable program stored on the memory.

Some embodiments of this disclosure further provide a computer storage medium, where the computer storage medium stores a computer-executable program, and the executable program is used for, upon being executed by a processor, implementing the method according to any embodiment of this disclosure.

Regarding the apparatus in the above-mentioned embodiments, the specific manner in which each module performs the operation has been described in detail in some embodiments of the method, and will not be described in detail here.

Figure 15:
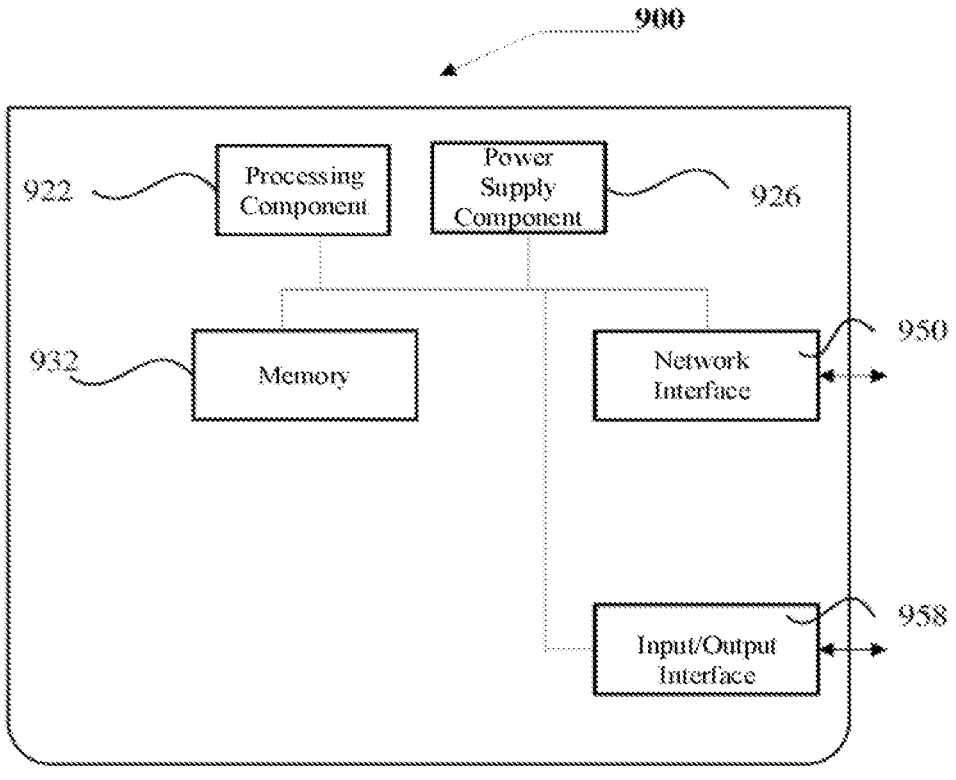
FIG. 15 is a block diagram of a base station according to some embodiments.

As shown in FIG. 15, some embodiments of this disclosure provide a structure of a base station. For example, the base station 900 may be provided as a network-side device. Referring to FIG. 15, the base station 900 includes a processing component 922, which further includes one or more processors, and a memory resource represented by memory 932 for storing instructions, such as application programs, executable by the processing component 922. The application programs stored in memory 932 may include one or more modules, each corresponding to a set of instructions. Additionally, the processing component 922 is configured to execute the instructions to perform any method applied to the base station as described above.

The base station 900 may further include a power supply component 926 configured to perform power management of the base station 900, a wired or wireless network interface 950 configured to connect the base station 900 to a network, and an input/output (I/O) interface 958. The base station 900 may operate based on an operating system stored in memory 932, such as Windows Server™, Mac OS X™, Unix™, Linux™, FreeBSD™ or the like.

Other embodiments of the disclosure will readily occur to those skilled in the art upon consideration of the specification and practice of the disclosure herein. This disclosure is intended to cover any modifications, uses, or adaptations of the invention that follow the general principles thereof and include common general knowledge or techniques in the art not disclosed in this disclosure. The specification and examples are to be regarded as exemplary only, with the true scope and spirit of the disclosure being indicated by the following claims.

It should be understood that the present invention is not limited to the precise structures described above and illustrated in the accompanying drawings, and that various modifications and changes may be made without departing from its scope.

What is claimed is:

1. A method for determining a transmission resource of a relative positioning signal, comprising:
   sending, by a base station, resource configuration information;
   wherein the resource configuration information is used for a terminal to determine the transmission resource for transmitting the relative positioning signal and used for enabling the terminal to:
   transmit the relative positioning signal on the transmission resource indicated by the resource configuration information, wherein the terminal is in an RRC disconnected state, the RRC disconnected state comprises an RRC idle state and an RRC inactive state; and
   establish, in response to being unable to determine the transmission resource based on a received system message, an RRC connection between the terminal and a base station.

2. The method according to claim 1, wherein the resource configuration information comprises at least one of following:
   first configuration information indicating the transmission resource;
   second configuration information indicating a manner of acquiring the transmission resource.

3. The method according to claim 2, wherein the first configuration information indicates a time-frequency domain resource location of the transmission resource.

4. The method according to claim 2, wherein the second configuration information indicates the terminal to multiplex transmission resources in a resource pool, and the resource pool comprises the transmission resources for the terminal to perform a sidelink communication.

5. The method according to claim 2, wherein the transmission resource is associated with a quality identifier of a relative positioning service, and the quality identifier indicates a quality indicator of the relative positioning service.

6. The method according to claim 1, wherein sending, by the base station, the resource configuration information comprises:

sending, by the base station, a system message carrying the resource configuration information.

7. The method according to claim 1, wherein the method further comprises:

receiving, by the base station, an acquisition request for acquiring the resource configuration information sent by the terminal;

wherein sending, by the base station, the resource configuration information comprises:

sending, by the base station, the resource configuration information to the terminal according to the acquisition request.

8. A method for determining a transmission resource of a relative positioning signal, comprising:

receiving, by a terminal, resource configuration information;

wherein the resource configuration information is used for the terminal to determine the transmission resource for transmitting the relative positioning signal;

transmitting, by the terminal, the relative positioning signal on the transmission resource indicated by the resource configuration information;

wherein the terminal is in an RRC disconnected state, the RRC disconnected state comprises an RRC idle state and an RRC inactive state, and the method further comprises:

establishing, by the terminal, in response to being unable to determine the transmission resource based on a received system message, an RRC connection between the terminal and a base station.

9. The method according to claim 8, wherein the resource configuration information comprises at least one of following:

first configuration information indicating the transmission resource;

second configuration information indicating a manner of acquiring the transmission resource.

10. The method according to claim 9, wherein the transmission resource is associated with a quality identifier of a relative positioning service, and the quality identifier indicates a quality indicator of the relative positioning service.

11. The method according to claim 10, further comprising:

determining, by the terminal, according to a quality identifier of a relative positioning service to be initiated, a transmission resource associated with the quality identifier of the relative positioning service to be initiated from the transmission resource indicated by the first configuration information;

wherein transmitting, by the terminal, the relative positioning signal on the transmission resource indicated by the resource configuration information comprises:

transmitting, by the terminal, the relative positioning signal on the transmission resource associated with the quality identifier of the relative positioning service to be initiated.

12. The method according to claim 9, wherein the method further comprises:

sending, by the terminal, an acquisition request for acquiring the resource configuration information to the base station;

wherein receiving, by the terminal, the resource configuration information comprises:

receiving the resource configuration information sent by the base station according to the acquisition request.

13. The method according to claim 12, wherein the acquisition request comprises at least one piece of request information, and each piece of the request information is used for requesting to acquire the transmission resource for one type of relative positioning signal.

14. The method according to claim 13, wherein the request information comprises information on at least one of following: a relative positioning indication, an identity of a peer terminal used for positioning of the terminal, a quality identifier of a relative positioning service, and a transmission cycle of the relative positioning signal.

15. The method according to claim 8, wherein receiving, by the terminal, the resource configuration information comprises:

receiving, by the terminal, a system message carrying the resource configuration information.

16. The method according to claim 8, wherein transmitting, by the terminal, the relative positioning signal on the transmission resource indicated by the resource configuration information comprises:

transmitting, by the terminal, the relative positioning signal on the transmission resource indicated based on the resource configuration information contained in the received system message.

17. The method according to claim 8, wherein being unable to determine the transmission resource based on the received system message comprises:

the received system message not comprising the resource configuration information;

or, the received system message comprising the resource configuration information and a quality indicator of the transmission resource indicated by the resource configuration information not meeting a quality indicator of a relative positioning service to be initiated.

18. A terminal, comprising:

an antenna;

a memory; and a processor, connected to the antenna and the memory, respectively, and configured to control transmission and reception of the antenna by executing computer-executable instructions stored on the memory, thereby implementing a method comprising:

receiving resource configuration information;

wherein the resource configuration information is used for the terminal to determine a transmission resource for transmitting a relative positioning signal;

the processor is further configured to transmit the relative positioning signal on the transmission resource indicated by the resource configuration information;

wherein the terminal is in an RRC disconnected state, the RRC disconnected state comprises an RRC idle state and an RRC inactive state, and the processor is further configured to:

establish, in response to being unable to determine the transmission resource based on a received system message, an RRC connection between the terminal and a base station.

\* \* \* \* \*